Patented June 22, 1943

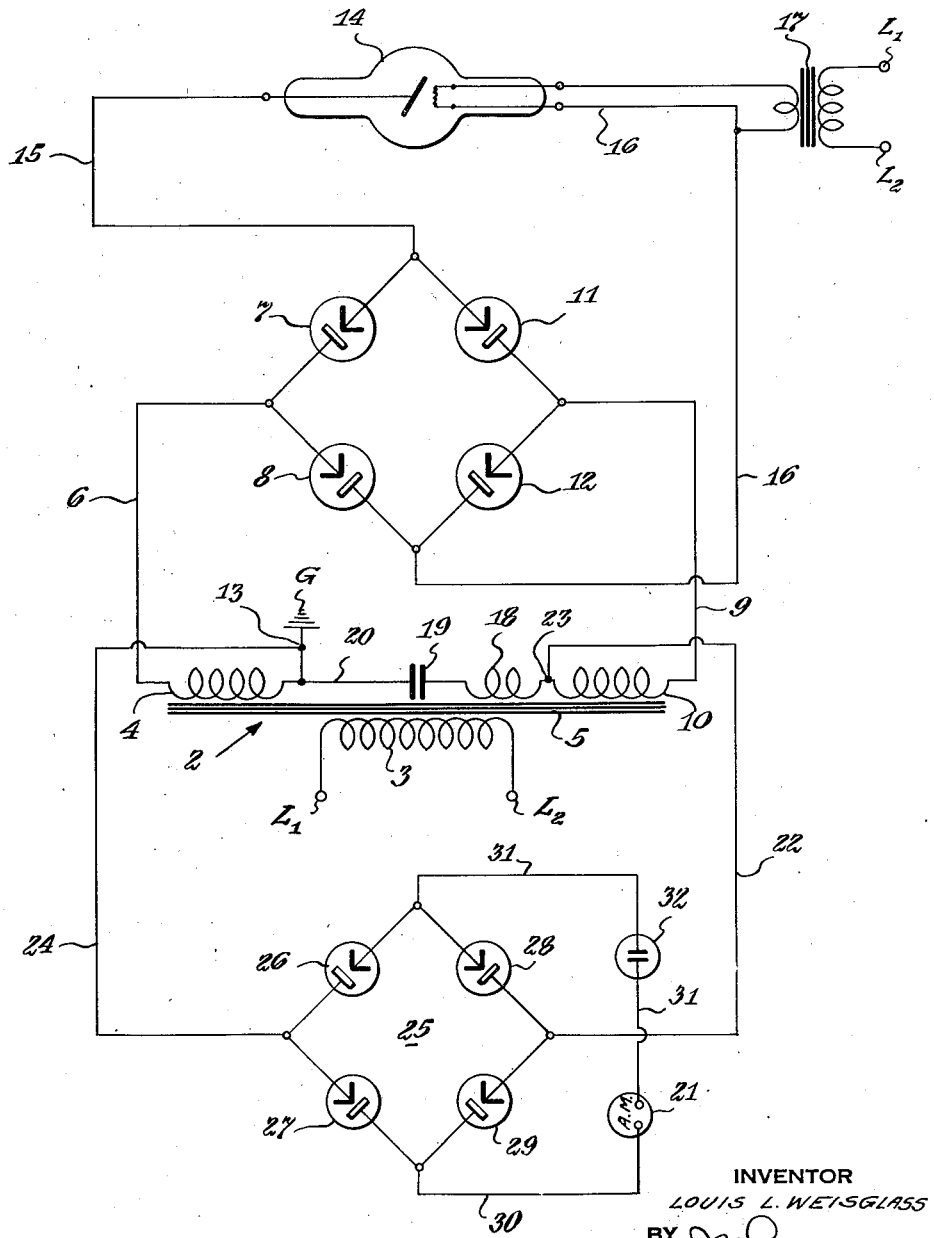

2,322,404

UNITED STATES PATENT OFFICE 2,322,404

METERING CIRCUIT FOR X-RAY APPARATUS

Louis L. Weisglass, New York, N. Y., assignor to Westinghouse Electric & Manufacturing Company, East Pittsburgh, Pa., a corporation of Pennsylvania Application October 23, 1941, Serial No. 416,187

8 Claims. (Cl. 250—100)

This invention relates to metering circuits for X-ray systems, and particularly to such systems wherein the energizing current supplied to the X-ray tube is of A. C. type, and full wave rectification is employed, there being in such systems a known and undesirable tendency of the milliammeter, conventionally employed as the current indicating means, to indicate other currents in addition to the true, useful current.

It is customary in such systems to combine with the X-ray tube and a high potential source of alternating current, a high-tension transformer, full-wave rectifying means between the secondary of said transformer and said tube, and a metering means which is in series with said transformer and carries a capacity current due to the capacity of different A. C. carrying parts of the high-tension transformer, and this capacity current introduces an undesirable factor into the meter indications and the problem encountered has been to balance out the capacity current flow and thus make it possible to provide an X-ray system in which the true useful current supplied to the X-ray tube can be precisely and accurately indicated.

Other workers in this field have proposed to solve the problem by the provision of means to pass bucking current through a compensatory transformer, as, for example, in the system forming the subject of U. S. Letters Patent to Cassen 2,098,275, owned by the assignee of the present application, and that system has been found correct in principle but as practised has been subject to various disadvantages and inconveniences.

Certain of the other expedients proposed in solution of the aforesaid problem are described in Patent 2,189,894 to Goldfield and Horsley. A typical disadvantage common to some of the above expedients is exemplified in the last-named patent, in which the bucking current is supplied by an auxiliary separate transformer having its primary winding in parallel with the primary of the high-tension transformer.

The auxiliary transformer is intended to apply another capacity current in the meter circuit of the same amount as the first-named capacity current, but 180° out of phase to afford a complete compensation, but unfortunately experience has shown deviations due to small voltage shifts in the two secondaries of the high-tension and auxiliary transformers respectively, so that the indications furnished by the meter are still not of optimum accuracy and reliability.

Under such circumstances, it is an object of the present invention to solve the stated problem by means which, while they preserve the advantages of the principle of compensation above set forth, are not subject to the disadvantages of the earlier expedients, and which afford improved operation and convenience in their installation, as will be herein made clear to those skilled in the art.

Ancillary to the above general object, it is a particular object of the present invention to eliminate the above-mentioned phase shift between the high tension secondary and that of the compensating transformer, and, in order to accomplish this object, a feature of the present invention consists in winding the compensating coil on the same core as the high-tension secondary.

Another object is to provide for the avoidance of the slight changes in meter calibration found to arise from the fact that where provision is made of a compensating condenser, the latter acts as a shunt to the meter circuit, and such changes in calibration are especially encountered when relatively large condensers are applied. The last-stated object can be attained, I have discovered, by choosing a relatively high compensation voltage, so that the condenser size can drop proportionately and no shunting effect will be noticeable.

Still further objects of the invention will become apparent to those skilled in the art by reference to the accompanying drawing, wherein is shown a schematic diagram of an X-ray tube circuit constructed in accordance with my present invention.

Referring now to the drawing in detail, I have shown a suitable source of supply of A. C. current of the usual commercial potential, comprising a pair of conductors L1 and L2.

A high tension transformer 2 has its primary winding 3 connected to the source of supply L1 and L2 for receiving energy from the latter. Specifically, the primary 3 is desirably energized through a step auto-transformer in the control (not shown). The secondary winding 4 of the transformer 2 is connected by means of a conductor 6 to the cathode and anode electrodes of a pair of rectifying valve tubes 7 and 8, respectively.

In a similar manner a conductor 9 connects the secondary winding 10 to the cathode and anode of a still further pair of rectifying valve tubes 11 and 12, respectively. The secondary windings 4 and 10 are center grounded at G.

An X-ray tube 14 has its anode connected by a conductor 15 to the cathodes of the respective rectifier valves 7 and 11, and the cathode of the X-ray tube is connected by a conductor 16 to the respective anodes of the rectifier valves 8 and 12.

The thermionic cathode of the X-ray tube receives heating current from a low tension filament transformer 17, the primary winding of which may be connected, as indicated, to the same commercial source of supply L1 and L2 as that to which the primary winding 3 of the high voltage transformer is connected.

In carrying my invention into effect, I wind upon the core 5 of the high-tension transformer (this being the same core upon which the secondaries 4 and 10 are wound) an individual compensatory winding 18 constructed and arranged to operate with approximately 1% of the voltage required for the coils 4 and 10, and in series with this compensating winding I apply a compensating condenser 19 adapted to produce a capacity current of the same amount as the sum of all capacity currents in the secondaries 4 and 10, but 180° out of phase therewith.

This condenser is connected to ground by a conductor 20, and has preferably a size of about .008 mfd., since with a compensating condenser of this size and high compensation voltages (maximum 1000–1200 v. R. M. S.), no shunting effect can be noticed.

The metering circuit proper includes a milliammeter 21, preferably of the D'Arsonval system type, employing direct current, and as A. C. type current is supplied through a conductor 22 (leading from a point 23 between the secondary winding 10 and compensating winding 18), and a conductor 24 connected to conductor 20, the current so supplied has to be rectified in order to make possible the use of a sensitive D. C. meter.

While the regular copper oxide rectifiers have been used for this purpose, their use is subject to the disadvantage that it is hard to read small currents when employing the non-proportional scale usually associated with these so-called "Rectox" rectifiers.

In many cases the same meters are used also for ballistic readings (milliampere-seconds), and calibration errors happened too frequently. This constitutes a reason why I prefer to provide a system which does not distort the linear scale of a D'Arsonval meter, and this can be achieved by using pairs of thermionic (mercury filled) rectifiers, as indicated generally at 25, the anode and cathode of one pair 26, 27 being connected by conductor 24 to the conductor 20 leading from the compensating condenser 19, while the anode and cathode of the other pair, 28, 29, are connected by conductor 22 to the point 23 between the secondary 10 and compensating winding 18.

The milliammeter 21 is included in series with a conductor 30 leading from the anodes of the valves 27 and 29 and a conductor 31 leading to the cathodes of valves 26 and 28. A blocking glow lamp 32 is employed in series with the conductor 31 and meter 21 because thermionic rectifiers, even without plate voltage, produce a small plate current. In other words, a meter disposed between plate and cathode of a thermionic rectifier, shows a small plate current which is caused by the initial velocity of the electrons. To stop this current in the system of the instant invention, the glow lamp 32 is provided in the D. C. circuit 30, 31 which also includes the meter 21. If there is no plate voltage, the glow lamp will not "break down," and thus the undesirable emission current will not be propagated. In case the high tension current flows, the glow lamp breaks down and closes the circuit.

The above provision of a blocking glow lamp is not intended to exclude the use of such other suitable instrumentalities for the purpose described as may occur to those skilled in the art when instructed by the present disclosure. For example, use may be made of a small bucking plate voltage in place of the blocking glow lamp, and a "Rectox" unit may be so used alternatively.

From the foregoing disclosure it will also be apparent that I have provided means to achieve the objects of this invention, as stated in the opening paragraphs of the specification, especially in the important respects that by winding the compensating winding upon the same core with the secondary winding of the high tension transformer, I have avoided the voltage shifts with their undesirable currents heretofore encountered, and by providing high voltage in the compensating winding, I have been enabled to cut down the size of the compensating condenser and thus to render shunting effects inconsiderable. Further, I have made it possible to employ the sensitive D. C. type D'Arsonville milliammeter and thus secure finer indications, by the use of thermionic mercury-filled valves in preference to the copper oxide rectifiers; and, finally, I have provided for eliminating plate currents due to initial electron velocities in the thermionic valves by the employment of a blocking glow-lamp or equivalent blocking means. All these improvements have contributed to the more reliable indication of the actual, useful current used in the X-ray tube.

What is claimed is:

1. In a circuit including an X-ray tube, a high-tension transformer and full-wave rectifying means between the secondary of said transformer and said tube, metering means including a secondary winding of said high-tension transformer which carries a capacity current due to the capacity of the circuit, a meter connected with said secondary winding for measuring the plate current of the X-ray tube, a compensating winding wound upon the same core with said secondary winding to prevent voltage shifts and undesirable current variations therebetween, and means to pass bucking current through said compensating winding in a direction and of a magnitude adapted to oppose and balance out the capacity current flow in said circuit to cause an acurate meter reading of the true X-ray tube current.

2. In a circuit including an X-ray tube, a high-tension transformer and full-wave rectifying means between the secondary of said transformer and said tube, metering means including a secondary winding of said high-tension transformer which carries a capacity current due to the capacity of the circuit, a meter connected with said secondary winding for measuring the plate current of the X-ray tube, a compensating winding wound upon the same core with said secondary winding to prevent voltage shifts and undesirable current variations therebetween, and means to pass bucking current through said compensating winding in a direction and of a magnitude adapted to oppose and balance out the capacity current flow in said circuit to cause an accurate meter reading of the true X-ray tube current, said last-mentioned means including a compensating condenser in series with said secondary winding and compensating winding.

3. In a circuit including an X-ray tube, a high-tension transformer and full-wave rectifying means between the secondary of said transformer and said tube, metering means including a secondary winding of said high-tension transformer which carries a capacity current due to the capacity of the circuit, a meter connected with said secondary winding for measuring the plate current of the X-ray tube, a compensating winding wound upon the same core with said secondary winding to prevent voltage shifts and undesirable current variations therebetween, and means to pass bucking current through said compensating winding in a direction and of a magnitude adapted to oppose and balance out the capacity current flow in said circuit to cause an accurate meter reading of the true X-ray tube current, said last-mentioned means including a compensating condenser in series with said secondary winding and compensating winding, and said compensating condenser having a size of about .008 mfd. and adapted to produce a capacity current of the same amount as the sum of all capacity currents in the secondaries of said high-tension transformer, but 180° out of phase therewith, and said compensating secondary being constructed and arranged to operate with compensating voltages of the order of 1000–1200 v. R. M. S. maximum.

4. In a circuit including an X-ray tube, a high-tension transformer and full-wave rectifying means between the secondary of said transformer and said tube, metering means including a secondary winding of said high-tension transformer which carries a capacity current due to the capacity of the circuit, a meter connected with said secondary winding for measuring the plate current of the X-ray tube, a compensating winding wound upon the same core with said secondary winding to prevent voltage shifts and undesirable current variations therebetween, means to pass bucking current through said compensating winding in a direction and of a magnitude adapted to oppose and balance out the capacity current flow in said circuit to cause an accurate meter reading of the true X-ray tube current, said meter being of D. C. type and included in a metering circuit supplied with A. C. current from said high-tension and compensating windings, and rectifying means in said metering circuit whereby only unidirectional current passes to said meter for measurement.

5. In a circuit including an X-ray tube, a high-tension transformer and full-wave rectifying means between the secondary of said transformer and said tube, metering means including a secondary winding of said high-tension transformer which carries a capacity current due to the capacity of the circuit, a meter connected with said secondary winding for measuring the plate current of the X-ray tube, a compensating winding wound upon the same core with said secondary winding to prevent voltage shifts and undesirable current variations therebetween, means to pass bucking current through said compensating winding in a direction and of a magnitude adapted to oppose and balance out the capacity current flow in said circuit to cause an accurate meter reading of the true X-ray tube current, said meter being of D. C. type and included in a metering circuit supplied with A. C. type current from said high-tension and compensating windings, and rectifying means in said metering circuit whereby only unidirectional current passes to said meter for measurement, said rectifying means comprising thermionic mercury-filled valves.

6. In a circuit including an X-ray tube, a high-tension transformer and full-wave rectifying means between the secondary of said transformer and said tube, metering means including a secondary winding of said high-tension transformer which carries a capacity current due to the capacity of the circuit, a meter connected with said secondary winding for measuring the plate current of the X-ray tube, a compensating winding wound upon the same core with said secondary winding, means to pass bucking current through said compensating winding in a direction and of a magnitude adapted to oppose and balance out the capacity current flow in said circuit, a compensating condenser in series with said secondary winding and compensating winding, said meter being of D. C. type and included in a metering circuit supplied with A. C. current from said high-tension and compensating windings, rectifying means in said metering circuit whereby only unidirectional current passes to said meter for measurement, said rectifying means comprising thermionic mercury-filled valves, and said meter being connected between the anodes and cathodes of said valves by conductors by which said meter is included in series with a blocking device adapted to suppress the propagation of plate current caused by the initial velocity of the electrons in the thermionic tubes, thus avoiding the undesired inclusion of such currents in the meter measurements.

7. In a circuit including an X-ray tube, a high-tension transformer and full-wave rectifying means between the secondary of said transformer and said tube, metering means including a secondary winding of said high-tension transformer which carries a capacity current due to the capacity of the circuit, a meter connected with said secondary winding for measuring the plate current of the X-ray tube, a compensating winding wound upon the same core with said secondary winding, means to pass bucking current through said compensating winding in a direction and of a magnitude adapted to oppose and balance out the capacity current flow in said circuit, a compensating condenser in series with said secondary winding and compensating winding, said meter being of D. C. type and included in a metering circuit supplied with A. C. current from said high-tension and compensating windings, rectifying means in said metering circuit whereby only unidirectional current passes to said meter for measurement, said rectifying means comprising thermionic mercury-filled valves, and said meter being connected between the anodes and cathodes of said valves by conductors by which said meter is included in series with a blocking glow lamp adapted to suppress the propagation of plate current caused by the initial velocity of the electrons in the thermionic tubes, thus avoiding the undesired inclusion of such currents in the meter measurements.

8. In a circuit including an X-ray tube, a high-tension transformer and a D. C. meter, means to effect full-wave rectification of the A. C. current supplied to said tube, means to supply to said meter for measurement current from which capacity current has been balanced out, a thermionic valve device for rectifying the A. C. supplied to said meter, and a blocking device by which the propagation of plate current due to initial electron velocity in said thermionic valve rectifier is avoided, thus restricting measurement of current in the meter to current used by the X-ray tube exclusively.

LOUIS L. WEISGLASS.